United States Patent [19]

Dykstra

[11] Patent Number: 4,684,102
[45] Date of Patent: Aug. 4, 1987

[54] PINCH VALVE

[75] Inventor: Raymond C. Dykstra, Boulder, Colo.

[73] Assignee: Cobe Laboratories, Inc., Lakewood, Colo.

[21] Appl. No.: 917,795

[22] Filed: Oct. 10, 1986

[51] Int. Cl.⁴ .............................................. F16L 55/14
[52] U.S. Cl. ............................................ 251/7; 251/4; 251/129.16; 251/69
[58] Field of Search ............. 251/4, 7, 129.15, 129.16, 251/69, 70; 335/266, 267

[56] References Cited

U.S. PATENT DOCUMENTS

| | | | |
|---|---|---|---|
| 3,275,964 | 9/1966 | Kumm | 335/267 |
| 3,373,769 | 3/1968 | Chaves, Jr. et al. | 251/129.16 |
| 4,063,554 | 12/1977 | Willock et al. | 128/214 R |
| 4,259,985 | 4/1981 | Bergmann | 251/7 |
| 4,273,307 | 6/1981 | Maliski et al. | 251/69 |
| 4,496,133 | 1/1985 | Sule | 251/7 |
| 4,512,627 | 4/1985 | Archer et al. | 335/267 |

Primary Examiner—Martin P. Schwadron
Assistant Examiner—Sheri M. Novack

[57]    ABSTRACT

A pinch valve employing first and second linear solenoids in series so that the first solenoid closes a flexible tube when powered, and the second solenoid is positioned to be pushed by a spring, to in-turn push the driving member of the first solenoid in a loss-of-power condition, and is positioned to be moved away from the first solenoid when powered so that the first solenoid is free to selectively close or open the tube.

9 Claims, 4 Drawing Figures

PINCH VALVE

FIELD OF THE INVENTION

The invention relates to pinch valves.

BACKGROUND OF THE INVENTION

Pinch valves are often used on medical devices to noninvasively close clear plastic flexible tubes carrying blood or other liquids. The tube is pinched between a movable nose driven by a linear or rotary solenoid and a fixed member. A linear solenoid can be arranged to pinch the tube when the solenoid is powered and to open the tube (through resiliency of the tube or a spring return) when the solenoid is not powered; this type of arrangement has been used to repeatedly open and close (e.g. a couple of times a minute) blood tubes on single needle control apparatus, e.g., as disclosed in Willock et al. U.S. Pat. No. 4,063,554. A linear solenoid can also be arranged to open the tube when powered and to close the tube using a spring when in the nonpowered state; this type of arrangement has been used as a safety closure mechanism activated on sensing of an air bubble or by a power failure, on two needle dialysis machines. When using a spring-to-close arrangement, large amounts of energy are required to set the spring, and it is noisy when it snaps shut.

SUMMARY OF THE INVENTION

The invention features in general using first and second linear solenoids in series in a pinch valve so that the first solenoid desirably efficiently and quietly closes a flexible tube when powered, and the second solenoid is positioned to be pushed by a spring to in turn push the driving member of the first .solenoid in a loss-of-power condition. The second solenoid is moved away from the first solenoid when powered so that the first solenoid is free to selectively close or open the tube.

In preferred embodiments the two solenoids are in line, and each have moving members on opposite sides of their housings; a compression spring behind the second solenoid is used to push the moving members of both solenoids to close the flexible tube; a nose on the driving member of the first solenoid has an end-of-travel position at a predetermined distance from the end of the member, the distance being sufficiently smaller than twice the wall thickness of the tube to guarantee occlusion of the tube, but sufficiently large, and the nose is sufficiently blunt, to prevent damage to the tube; the nose is made of plastic (most preferably nylon) and has a radius at its point of contact greater than 3/32" (most preferably around ⅛" inch); and the fixed member has a transparent window to permit visual verification of tube occlusion.

Other advantages and features of the invention will be apparent from the following description of a preferred embodiment thereof and from the claims.

DESCRIPTON OF THE PREFERRED EMBODIMENT

The preferred embodiment will now be described.

DRAWINGS

STRUCTURE

Figure 1:
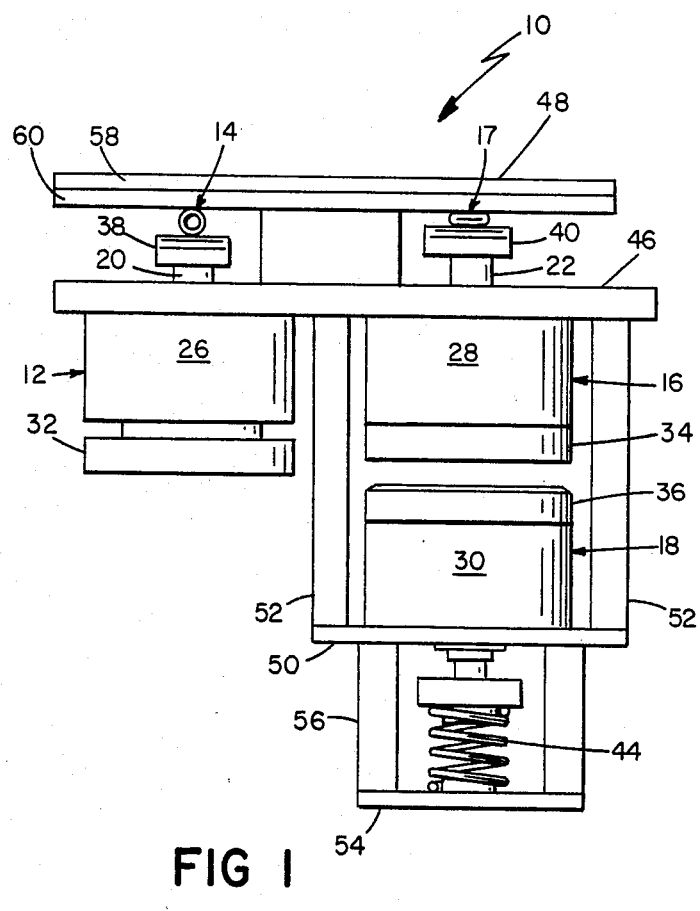
FIG. 1 is a diagrammatic elevation showing a pinch valve according to the invention.

Referring to the figures, there is shown two-tube pinch valve 10, including linear solenoid 12 for occluding flexible, clear plastic, tube 14 (carrying blood from a patient) and linear solenoids 16, 18 arranged in series to flexible tube 17 (returning blood to a patient). Valve 10 is used on a dialysate preparation and supply machine during single needle control. Solenoids 12, 16, 18 each include a respective driving member 20, 22, or 24, that is moved outward from the respective solenoid housing 26, 28, or 30, when unpowered, and a respective clapper 32, 34, or 36, that extends from the other side of the housing and is fixedly connected to the respective driving member to move with it. In FIG. 1, solenoid 12 is shown in the unpowered state, and solenoids 16, 18 are shown in the powered state.

Connected to driving members 20, 22 are blunt noses 38, 40. Connected to driving member 24 is spring bushing 42 contacting compression spring 44. Housings 26, 28 are directly fixedly connected to mounting plate 46 supporting anvil 48. Housing 30 is fixedly connected with respect to mounting plate 46 via plate 50, connected to plate 46 via columns 52. Spring 44 is retained by a clamp 54, connected to plate 50 by columns 56.

Figure 3:
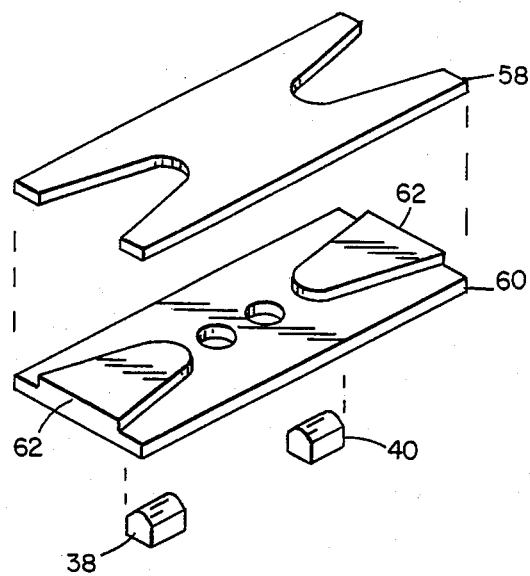
FIG. 3 is a partial diagrammatic perspective view showing a two-piece anvil and blunt noses of the FIG. 1 pinch valve.
Figure 4:
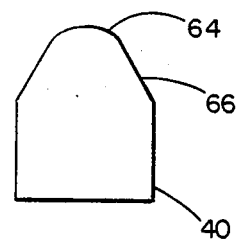
FIG. 4 is a side elevation of a blunt nose of the FIG. 1 pinch valve.

Referring to FIG. 3, it is seen that anvil 48 includes upper stiff metal anvil plate 58, and lower transparent window plate 60 (clear polycarbonate) having raised window portions 62 to permit visual inspection of tubes 14, 17, positioned between them and blunt noses 38, 40 therebelow. Referring to FIG. 4, it is seen that nose 40 (made of Zytel glass filled nylon) includes blunt end 64 having a 0.125" radius and 30° angled portions 66 adjacent thereto. The 0.125" radius is preferred to avoid wear of the tubing without enlarging the region of occlusion (and thus the force of occlusion) too much; a radius 3/32" or greater could work.

Blunt nose 40, solenoid 16, and anvil 48 are assembled, and their tolerances are such, so that the end-of-travel position of blunt nose 40 is very accurately positioned with respect to the lower surface of anvil 48. The distance between the two is sufficiently below twice the wall-thickness of the flexible tube to guarantee occlusion of the tube, but is sufficiently large to prevent damage to the tube by pressing it too much. For a quarter-inch flexible tube having a 0.047" wall thickness, the thickness of both walls is 0.094". The permissible gap, accounting for tolerance stackup, is between an upper limit of 0.075" (to guarantee occlusion) and a lower limit of 0.060" (to limit damage to the tube that might occur at lower values).

OPERATION

In use on a single needle dialysate preparation and supply machine, solenoid 12 is used to selectively open and close tube 14, and solenoid 16 is used to selectively open and close tube 17. Owing to the blunt nature of noses 38, 40 and the precise end-of-travel position of noses 38, 40, occlusion of tubes 14, 17 is guaranteed at the same time that they are prevented from damage that could be caused by too much force.

The use of clear windows 62 permits visual verification of complete occlusion, as the absence of blood will be seen in the window when properly occluded.

Figure 2:
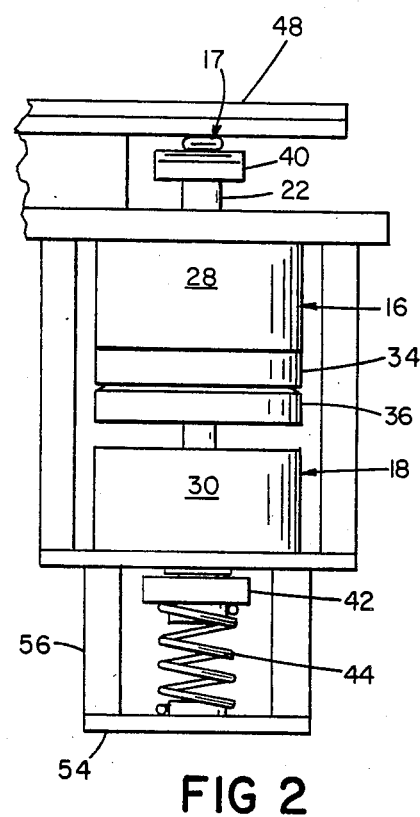
FIG. 2 is a partial diagrammatic elevation of the FIG. 1 pinch valve in a loss-of-power condition.

During operation, solenoid 18 is in the powered state in which its clapper 36 is lowered (FIG. 1), to permit solenoid 16 to be repeatedly powered and unpowered and tube 17 to be selectively opened and closed. In the event of a loss of power, spring 44 pushes driving member 24 and its associated clapper 36 upward to the position shown in FIG. 2, pushing clapper 34 upward and its associated nose 40 to close flexible tube 16, preventing any further blood from being returned to the patient. The use of a solenoid to close the tube when powered, Provides for an efficient and quiet operation.

OTHER EMBODIMENTS

Other embodiments of the invention are within the scope of the following claims.

What is claimed is:

1. A pinch valve comprising
  a fixed member,
  a flexible tube adjacent said fixed member,
  a first linear solenoid having a housing fixedly mounted with respect to said fixed member and a first movable member that is movable between a first, powered position and a second unpowered position,
  said first member carrying a nose on the other side of said tube from said fixed member, said nose occluding said flexible tube when in said first position and not occluding said tube when in said second position,
  said first solenoid having a second movable member that is fixedly connected with respect to said first movable member to move with it,
  a second linear solenoid having a housing fixedly mounted with respect to said housing of said first solenoid and a third movable member that is movable between first and second positions so as to push said second member and to cause said first member to be pushed to said first position when said third member moves from said second position to said first position,
  said second linear solenoid including a fourth movable member that is fixedly connected with respect to said third movable member to move with it, and
  a spring tending to push said fourth member so that said third member pushes said second member and said first member to said first position,
  said second linear solenoid being activatable to overcome the force of said spring and to put said third member into said second position when activated.

2. The pinch valve of claim 1 wherein said first and second linear solenoids are arranged in line, and said first and second movable members are on opposite sides of said first housing, and said third and fourth movable members are on opposite sides of said second housing.

3. The apparatus of claim 2 wherein said spring is a compression spring biasing said fourth member toward said second housing.

4. The pinch valve of claim 1 wherein, when said nose is in said first position, it is at a predetermined distance from said fixed member, said distance being sufficiently smaller than twice said wall thickness to guarantee occlusion of said flexible tube, said distance being sufficiently large, and said nose being sufficiently blunt, to prevent damage to the tube.

5. The pinch valve of claim 4 wherein said nose is made of plastic material.

6. The pinch valve of claim 5 wherein said nose is made of nylon.

7. The pinch valve of claim 4 wherein said nose has a radius at its point of contact greater than 3/32".

8. The pinch valve of claim 7 wherein said radius is about ⅛".

9. The pinch valve of claim 1 further comprising a third solenoid having a movable member that squeezes a second tube between it and a second fixed member when powered to occlude said tube.

* * * * *